C. L. BROUWER-ANCHER.
GRAPE FRUIT PLIERS.
APPLICATION FILED MAY 17, 1916.
1,223,556.
Patented Apr. 24, 1917.
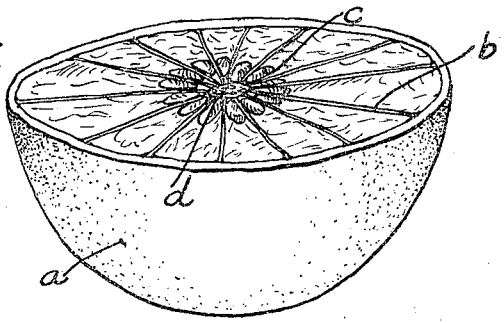
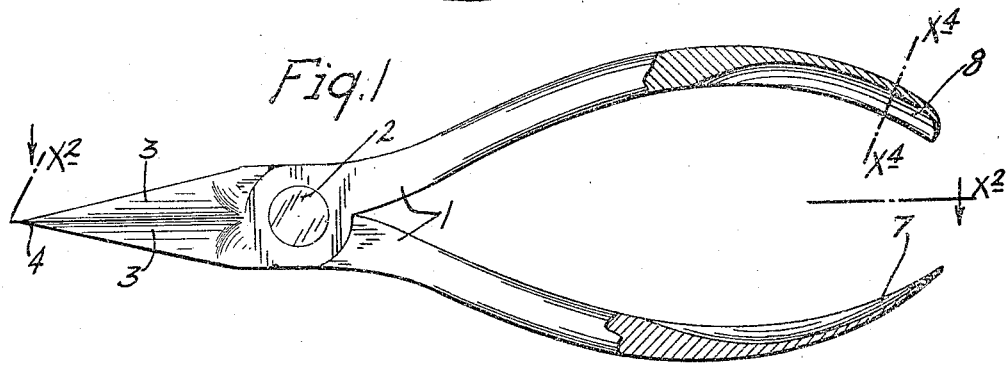
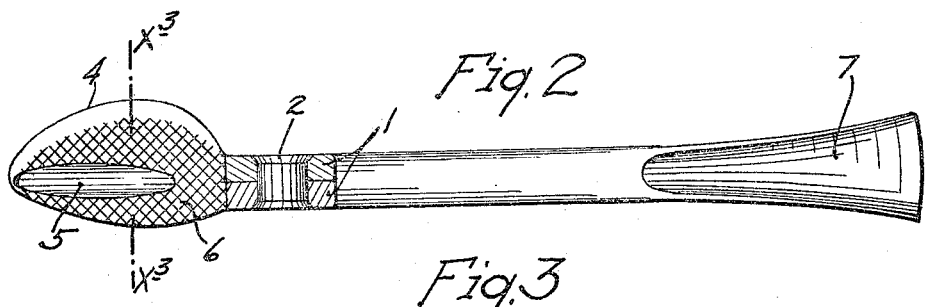
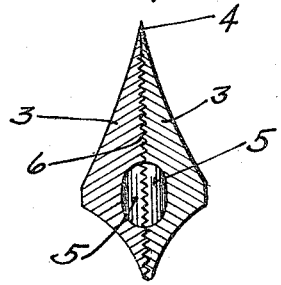
WITNESSES
E. C. Wells
H. L. Opsahl.
INVENTOR
Cornelis Lindsay Brouwer-Ancher
BY HIS ATTORNEYS

UNITED STATES PATENT OFFICE.

CORNELIS LINDSAY BROUWER-ANCHER, OF MINNEAPOLIS, MINNESOTA.

GRAPE-FRUIT PLIERS.

1,223,556.  Specification of Letters Patent.  Patented Apr. 24, 1917.

Application filed May 17, 1916. Serial No. 98,067.

*To all whom it may concern:*

Be it known that I, CORNELIS LINDSAY BROUWER-ANCHER, a citizen of the United States, residing at Minneapolis, in the county of Hennepin and State of Minnesota, have invented certain new and useful Improvements in Grape-Fruit Pliers; and I do hereby declare the following to be a full, clear, and exact description of the invention, such as will enable others skilled in the art to which it appertains to make and use the same.

My invention has for its object to provide an improved device for removing the seeds, core, and partitions of citrus fruit, and is especially designed for preparing grape fruit for table use. This improved tool I have styled a grape fruit plier.

In the accompanying drawings which illustrate the improved plier in its preferred form, like characters indicate like parts throughout the several views.

Referring to the drawings:

Figure 1 is a plan view of the improved plier, some parts being sectioned;

Fig. 2 is a section taken on the line $x^2$ $x^2$ of Fig. 1;

Fig. 3 is a section taken on the line $x^3$ $x^3$ of Fig. 2;

Fig. 4 is a section on the line $x^4$ $x^4$ of Fig. 1; and

Fig. 5 is a perspective showing a half section of a grape fruit.

In some respects, the plier is a good deal like the ordinary plier but it is provided with special features which adapt it to the particular work above indicated. The plier is made up of a pair of levers 1, pivoted at 2 and provided with a pair of coöperating flat blade-like jaws 3, which, at one edge, terminate in curved cutting edges 4. The opposing faces of these blades 3 are formed with core-receiving pockets 5, and to give the same a better grip on the partitions of the grape fruit, they are serrated or roughened, as indicated at 6. Said serrated or roughened surface 6 does not extend outward to the cutting edge 4, but terminates some little distance inward thereof, as best shown in Figs. 2 and 3.

One of the levers 1, at its free end, is made in the form of a curved concave chisel 7 and the free end of the other lever is made in the form of concave gouge having an inturned edge, as indicated at 8.

In Fig. 5, the rind, the partitions, the seeds and the core of the grape fruit are indicated, respectively, by the letters *a*, *b*, *c* and *d*.

The use of the tool is as follows: First by the use of the gouge 8, the seeds are gouged out and removed. Then the partitions are removed in succession by placing the jaws 3, while slightly separated, straddle of the partitions, and sliding them back until the cutting edges 4 strike the rind. Then the blades are pressed together and gripped onto the partition, and the partition is pulled from the fruit. The sharp edges 4 serve to separate the fruit pulp from the partitions and permit the blades to be readily forced downward as far as the rind. If after the partitions have been removed, more or less of the core still remains in the fruit, which will usually be the case, this core may be readily removed by forcing the jaws straddle of the same, closing the jaws and inclosing the core within the opposing pockets 5. When the jaws are thus closed on the core, the sharp extreme ends thereof will clip the core, from the rind at its base and the core may then be easily removed. To separate the pulp from the rind, the chisel 7 is run between the same to the rind. A grape fruit or any other citrus fruit thus prepared, will be entirely free from core, seeds and partitions, and the pulp or segmental portions of the fruit will be loosened from the rind, so that they may be easily removed with a spoon.

By the use of this special tool or plier, grape fruit or the like, may be quickly prepared, and when thus prepared, will be in much better condition for table use than when prepared with a knife, or any other means which leaves the partitions in the fruit. All prior devices known to me for preparing grape fruit, leave the partitions in the fruit. These partitions are not only indigestible, but give a bitter taste to the fruit and their removal is, therefore, highly desirable.

It will be noted that the sharp edges 4 extend in the planes of the flat surfaces of the respective jaws. Furthermore, it will be noted that the said sharp edges 4 follow a differential curve and that they have the greatest curve at the points of the blades. This adapts the sharp edges to fit the concavity of the interior of the rind of both small and large grape fruits.

What I claim is:

1. A plier for the preparation of citrus fruit having flat blade-like jaws with sharp cutting edges extending in the planes of the opposing flat surfaces of said jaws.

2. A plier for the preparation of citrus fruit comprising intermediately pivoted levers formed with flat blade-like jaws with curved cutting edges extending in the planes of the opposing flat surfaces of said jaws.

3. A plier for the preparation of citrus fruit comprising intermediately pivoted levers formed with flat blade-like jaws with curved cutting edges, the opposing faces of said jaws being roughened to increase their grip, but the said roughened surfaces terminating inward of said cutting edges.

4. A plier for the preparation of citrus fruit having flat blade-like jaws with sharp cutting edges, the said jaws in their opposing faces having core receiving pockets.

5. A plier for the preparation of citrus fruit comprising intermediately pivoted levers formed with flat blade-like jaws with curved cutting edges, and the opposing faces of said jaws having longitudinally extended core receiving pockets that terminate short of the outer extremities thereof.

6. A plier for the preparation of citrus fruit comprising intermediately pivoted levers formed with flat blade-like jaws with curved cutting edges, the opposing faces of said jaws having longitudinally extended core receiving pockets that terminate short of the outer extremities thereof, and the said opposing faces of said jaws being roughened to points that terminate inward of said sharp cutting edges.

7. A plier for the preparation of citrus fruit having flat blade-like jaws with sharp cutting edges lying in the planes of the opposing flat surfaces of said jaws and extending on the lines of a differential curve and having the greatest curve near the outer extremities of said jaws.

In testimony whereof I affix my signature in presence of two witnesses.

CORNELIS LINDSAY BROUWER-ANCHER.

Witnesses:
B. G. WHEELER,
HARRY D. KILGORE.

Copies of this patent may be obtained for five cents each, by addressing the "Commissioner of Patents, Washington, D. C."